(12) United States Patent
Lee et al.

(10) Patent No.: US 9,510,323 B2
(45) Date of Patent: *Nov. 29, 2016

(54) APPARATUS FOR TRANSMITTING AND RECEIVING DATA IN A WIRELESS COMMUNICATION SYSTEM AND METHOD THEREOF

(71) Applicant: LG ELECTRONICS INC., Seoul (KR)

(72) Inventors: Moon Il Lee, Anyang-si (KR); Seung Hee Han, Anyang-si (KR); Jae Hoon Chung, Anyang-si (KR); Hyun Soo Ko, Anyang-si (KR); Bin Chul Ihm, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/877,813

(22) Filed: Oct. 7, 2015

(65) Prior Publication Data

US 2016/0037485 A1    Feb. 4, 2016

Related U.S. Application Data

(63) Continuation of application No. 14/203,027, filed on Mar. 10, 2014, now Pat. No. 9,185,683, which is a (Continued)

(30) Foreign Application Priority Data

May 27, 2010    (KR) ........................ 10-2010-0049835

(51) Int. Cl.
*H04H 20/71* (2008.01)
*H04W 72/00* (2009.01)
(Continued)

(52) U.S. Cl.
CPC ............ *H04W 72/005* (2013.01); *H04L 5/005* (2013.01); *H04L 5/0051* (2013.01); *H04L 5/0007* (2013.01); *H04W 28/06* (2013.01)

(58) Field of Classification Search
CPC ... H04W 4/06; H04W 72/005; H04W 28/06; H04W 48/16; H04W 24/02; H04L 5/005
USPC ............ 370/312, 252, 231, 352, 229, 230.1, 370/236, 235, 356, 412, 392, 493, 35, 358, 370/355, 389, 394
See application file for complete search history.

(56) References Cited

U.S. PATENT DOCUMENTS 8,089,921 B2    1/2012    Yamada et al.
8,305,987 B2    11/2012   Fong et al.
(Continued)

FOREIGN PATENT DOCUMENTS

KR    1020090017450    2/2009
KR    10-2009-0043434   5/2009
(Continued)

OTHER PUBLICATIONS

The State Intellectual Property Office of the People's Republic of China Application Serial No. 201080027632.7, Office Action dated Sep. 2, 2014, 7 pages.
(Continued)

*Primary Examiner* — Chi H Pham
*Assistant Examiner* — Alexander O Boakye
(74) *Attorney, Agent, or Firm* — Lee Hong Degerman Kang & Waimey

(57) ABSTRACT

An apparatus for transmitting and receiving data in a wireless communication system method thereof are disclosed. In a terminal of a wireless communication system, the present invention includes receiving a physical downlink control channel (hereinafter abbreviated PDCCH), receiving a physical downlink shared channel (hereinafter abbreviated PDSCH), and demodulating the PDSCH by interpreting the PDCCH according to a type of a subframe including the PDCCH and the PDSCH.

16 Claims, 13 Drawing Sheets

Related U.S. Application Data continuation of application No. 13/380,492, filed as application No. PCT/KR2010/003854 on Jun. 15, 2010, now Pat. No. 8,711,777.

(60) Provisional application No. 61/219,291, filed on Jun. 22, 2009.

(51) Int. Cl.
*H04L 5/00* (2006.01)
*H04W 28/06* (2009.01)

(56) References Cited

U.S. PATENT DOCUMENTS 8,711,777 B2  4/2014  Lee et al.
9,185,683 B2 * 11/2015  Lee .................. H04L 5/005
2009/0143072 A1  6/2009  Montojo et al.

FOREIGN PATENT DOCUMENTS

| KR | 10-2009-0086040 | 8/2009 |
| WO | 2007/078165 | 7/2007 |
| WO | 2008/156034 | 12/2008 |
| WO | 2009/020178 | 2/2009 |

OTHER PUBLICATIONS

Korean Intellectual Property Office Application Serial No. 10-2010-0049835, Notice of Allowance dated Nov. 19, 2013, 2 pages.

* cited by examiner

Fig. 6
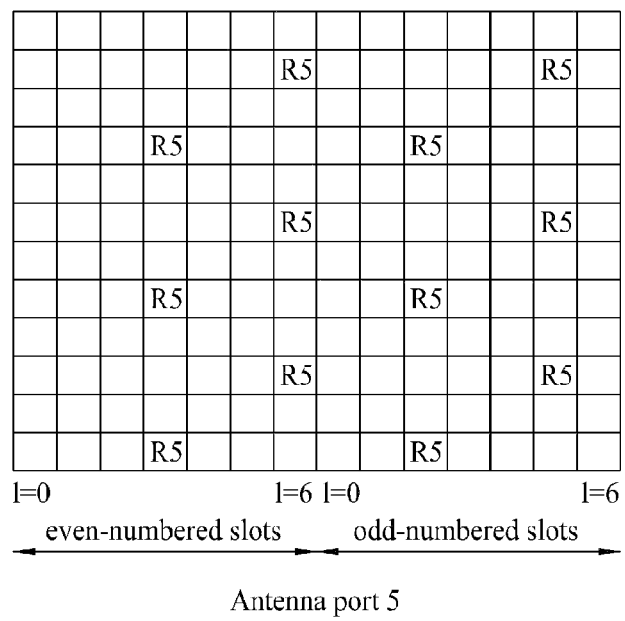
l=0　　　　l=6 l=0　　　　l=6
even-numbered slots　odd-numbered slots
Antenna port 5
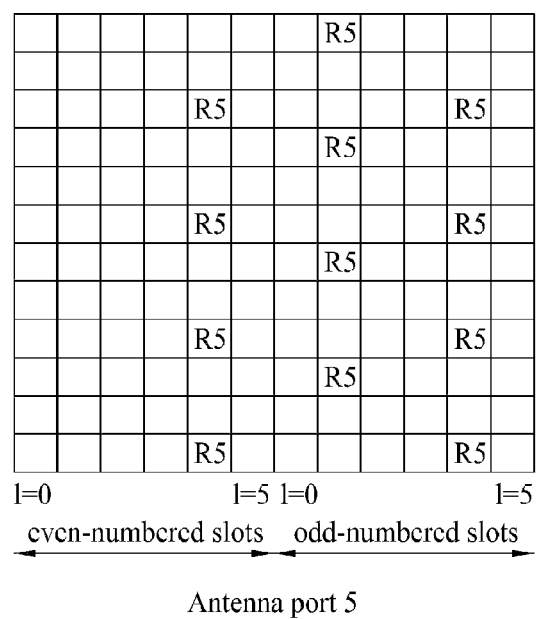
l=0　　　　l=5 l=0　　　　l=5
even-numbered slots　odd-numbered slots
Antenna port 5

Fig. 7
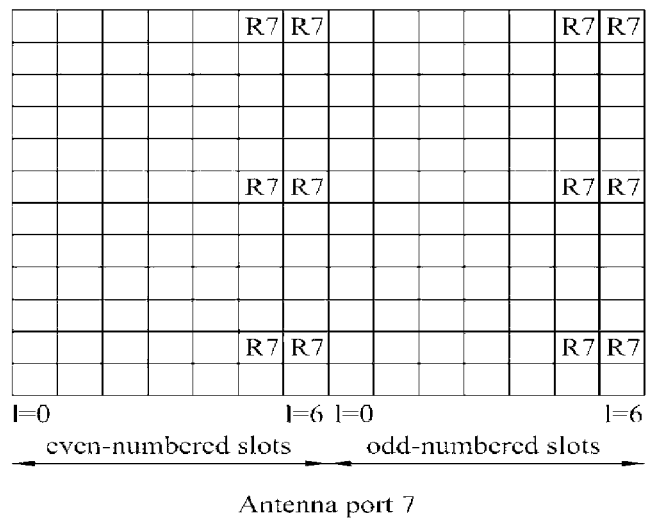
Antenna port 7
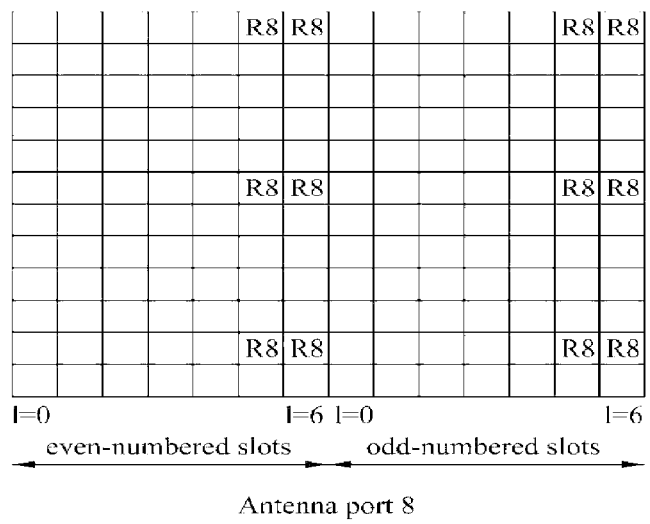
Antenna port 8

APPARATUS FOR TRANSMITTING AND RECEIVING DATA IN A WIRELESS COMMUNICATION SYSTEM AND METHOD THEREOF

CROSS-REFERENCE TO RELATED APPLICATIONS

This application is a continuation of U.S. patent application Ser. No. 14/203,027, filed on Mar. 10, 2014, now U.S. Pat. No. 9,185,683, which is a continuation of U.S. patent application Ser. No. 13/380,492, filed on Dec. 22, 2011, now U.S. Pat. No. 8,711,777, which is the National Stage filing under 35 U.S.C. 371 of International Application No. PCT/KR2010/003854, filed on Jun. 15, 2010, which claims the benefit of earlier filing date and right of priority to Korean Application No. 10-2010-0049835, filed on May 27, 2010, and also claims the benefit of U.S. Provisional Application No. 61/219,291, filed on Jun. 22, 2009, the contents of which are all hereby incorporated by reference herein in their entirety.

TECHNICAL FIELD

The present invention relates to a wireless communication system, and more particularly, to an apparatus for transmitting and receiving data in a wireless communication system method thereof.

BACKGROUND ART

First of all, a frame structure of a wireless communication system is described with reference to FIG. 1 as follows.

FIG. 1 is a diagram for a frame structure of LTE (long term evolution) system.

Referring to FIG. 1, a single frame consists of 10 subframes. And, a single subframe consists of 2 slots. A time taken to transmit a single subframe is called a transmission time interval (hereinafter abbreviated TTI). For instance, a single subframe is 1 ms and a single slot is 0.5 ms.

A single slot consists of a plurality of OFDM (orthogonal frequency division multiplexing) symbols. In this case, the OFDM symbol can be called an SC-FDMA symbol or a symbols duration.

A single slot consists of 7 or 6 PFDM symbols according to a length of a cyclic prefix (hereinafter abbreviated CP). In LTE system, there are a normal CP and an extended CP. In case of using a normal CP, a single slot consists of 7 OFDM symbols. In case of using an extended CP, a single slot consists of 6 OFDM symbols.

Referring to FIG. 1, a primary synchronization channel (hereinafter abbreviated P-SCH) and a secondary synchronization channel (hereinafter abbreviated S-SCH) are transmitted for synchronization every frame. Moreover, in order to transmit resource allocation information of each subframe and the like every frame, a base station transmits a physical downlink control channel (hereinafter abbreviated PDCCH) on $0^{th}$ to $2^{nd}$ OFDM symbols. In doing so, it is able to send the PDCCH on $0^{th}$ OFDM symbol, $0^{th}$ and $1^{st}$ OFDM symbols or $0^{th}$ to $2^{nd}$ OFDM symbols according to a quantity of the PDCCH. The number of OFDM symbols used by the PDCCH is variable each subframe. A base station informs a mobile station of the corresponding information via a physical control format indicator channel (hereinafter abbreviated PCFICH). Thus, the PCFICH should be transmitted each subframe and has total 3 kinds of informations. Table 1 shows a control format indicator (hereinafter abbreviated CFI). If CFI=1, it indicates that the PDCCH is transmitted on the $0^{th}$ OFDM symbol only. If CFI=2, it indicates that the PDCCH is transmitted on the $0^{th}$ and $1^{st}$ OFDM symbols. If CFI=3, it indicates that the PDCCH is transmitted on the $0^{th}$ to $2^{nd}$ OFDM symbols.

TABLE 1

| CFI | CFI codeword $<b_0, b_1, \ldots, b_{31}>$ |
|---|---|
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 4 (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

The CFI can be defined different according to a bandwidth. For instance, if a bandwidth of system is smaller than a specific threshold, 'CFI=1', 'CFI=2' and 'CFI=3' can indicate that the PDCCH is transmitted on '2 OFDM symbols', '3 OFDM symbols' and '4 OFDM symbols', respectively.

FIG. 2 is a diagram for a transmission format of PCFICH.

Referring to FIG. 2, a resource element group (hereinafter abbreviated REG) consists of 4 subcarriers, is constructed with data subcarriers except a reference signal (hereinafter abbreviated RS), and is generally transmitted by applying a transmit diversity scheme. Moreover, in order to avoid inter-cell interference, a position of the REG is frequency shifted to use. Since PCFICH is always transmitted on a first OFDM symbol of a subframe, if a receiver receives a subframe, the receiver checks information of PCFICH first and then checks information of PDCCH. A size and usage of the PDCCH vary according to a format of a downlink control indicator (hereinafter abbreviated DCI). In particular, the size of the PDCCH can vary according to a coding rate. For instance, the DCI format can be defined as Table 2.

TABLE 2

| DCI format | Objectives |
|---|---|
| 0 | Scheduling of PUSCH |
| 1 | Scheduling of one PDSCH codeword |
| 1A | Compact scheduling of one PDSCH codeword |
| 1B | Closed-loop single-rank transmission |
| 1C | Paging, RACH response and dynamic BCCH |
| 2 | Downlink scheduling of closed-loop rank-adapted spatial multiplexing mode |
| 2A | Downlink scheduling of open-loop rank-adapted spatial multiplexing |
| 3 | TPC commands for PUCCH and PUSCH with 2 bit power adjustments |
| 3A | TPC commands for PUCCH and PUSCH with single bit power adjustments |

The DC format shown in Table 2 is independently applied per mobile station. And, PDCCHs of several mobile stations are multiplexed within a single subframe. Channel coding is independently performed on the multiplexed PDCCH of the mobile stations and cyclic redundancy check (hereinafter abbreviated CRC) is applied thereto. In doing so, in order to enable the corresponding mobile station to receive its PDCCH, a unique ID of each mobile station is applied to the CRC.

Yet, since the mobile station is not aware of a location of its PDCCH, the mobile station performs blind detection on all PDCCHs of the corresponding DCI format each subframe until receiving the PDCCH having its mobile station ID. In addition, DCI format 0 and DCI format 1A are designed to be always received by the mobile station without increasing complexity in a manner of being configured to have the same size of information bits. In particular, the DCI format 1A is used in a fallback mode and an MIMO transmission scheme is determined according to a transmitting antenna configuration. For instance, in 3GPP Rel-8 system, a base station is able to have 1, 2 or 4 transmitting antennas. When a physical downlink shared channel (hereinafter abbreviated PDSCH) is transmitted using the DCI format 1A, if a base station has 1 transmitting antenna, the PDSCH is transmitted as single input signal output (hereinafter abbreviated SISO). If a base station has 2 or 4 transmitting antennas, the PDSCH is transmitted using the MIMO diversity scheme (T×D) shown in Table 3. In Table 3, a row of a matrix indicating a diversity scheme indicates a transmitting antenna, while a column is usable as a frequency or time.

TABLE 3

| | 2Tx | 4Tx |
|---|---|---|
| Transmission scheme for PDSCH (T × D) | $\frac{1}{\sqrt{2}}\begin{pmatrix} S_1 & S_2 \\ -S_2^* & S_1^* \end{pmatrix}$ | $\frac{1}{\sqrt{2}}\begin{pmatrix} S_1 & S_2 & 0 & 0 \\ 0 & 0 & S_3 & S_4 \\ -S_2^* & S_1^* & 0 & 0 \\ 0 & 0 & -S_4^* & S_3^* \end{pmatrix}$ |

Data transmitted by the MIMO transmission scheme shown in Table 3 is demodulated using a cell specific reference signal (hereinafter abbreviated CRS). FIG. 3 is a diagram of a structure of CRS according to the number of transmitting antenna(s).

The CRC structure shown in FIG. 3 can be represented as a single resource block (hereinafter abbreviated RB) within a single subframe shown in FIG. 1. In particular, N resource blocks construct a single subframe. And, a value of N is determined according to a system bandwidth.

Reference signal used for MIMO transmission scheme can be defined as an antenna port. In case of the above described SISO, it can be described that the antenna port 0 is used. Each antenna port can be defined as a cell only reference signal or a mobile station only reference signal. In case of the mobile station only reference signal, a corresponding layer is just decoded via the corresponding reference signal without description of special MIMO transmission scheme.

FIG. 4 is a diagram for a structure of antenna ports 0 to 3 (R0 to R3) corresponding to cell only reference signals in case of a normal CP. FIG. 5 is a diagram for a structure of antenna ports 0 to 3 (R0 to R3) corresponding to cell only reference signals in case of an extended normal CP.

And, FIG. 6 and FIG. 7 are diagrams of antenna ports 5, 7 and 8 (R5, R7, R8) corresponding to mobile station only reference signals.

In case of the mobile station reference signals shown in FIG. 6 and FIG. 7, they are characterized in that a mobile station is able to perform demodulation without description o special MIMO transmission scheme.

Meanwhile, a single radio frame can include M MBSFN subframes. In this case, a PDSCH region of the MBSFN subframe does not include a CRS. In case of Rel-9 mobile station, it is set not to receive PDSCH in the MBSFN subframe. Since the corresponding PDSCH region does not include the CRS, estimation for channel state information is not performed as well. Yet, in case of Rel-10 mobile station, a precoded demodulation reference signal (RS) is used and can be configured to transmit data on the PDSCH region of the MBSFN subframe. Although this subframe is recognized as the MBSFN subframe by the Rel-8 mobile station, it is recognized as a subframe capable of carrying PDSCH by the Rel-10 mobile station. This is named 'LTE-A only subframe' in the following description.

DISCLOSURE OF INVENTION

Technical Problem

However, as mentioned in the foregoing description, a fallback mode is demodulated using CRS. In case of LTE-A only subframe, since CRS does not exist in PDSCH region, it is able to use the diversity scheme shown in Table 3. In case of Rel-10 mobile station, when scheduling is performed on the LTE-A only subframe, it is impossible to use the fallback mode. Therefore, the demand for a definition of a callback mode transmitting method in an LTE-A only subframe is rising.

Solution to Problem

Accordingly, the present invention is directed to an apparatus for transmitting and receiving data in a wireless communication system method thereof that substantially obviate one or more of the problems due to limitations and disadvantages of the related art.

As mentioned in the foregoing description, since CRS is not transmitted in LTE-A only subframe, it is necessary to define a fallback mode transmitting method in LTE-A only subframe.

An object of the present invention is to provide an apparatus for transmitting and receiving data in a wireless communication system method thereof, by which data for fallback mode transmission can be received in LTE-A only subframe.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of receiving data, which is received by a terminal in a wireless communication system, according to the present invention includes the steps of receiving a physical downlink control channel (hereinafter abbreviated PDCCH), receiving a physical downlink shared channel ((hereinafter abbreviated PDSCH), and demodulating the PDSCH by interpreting the PDCCH according to a type of a subframe including the PDCCH and the PDSCH.

Preferably, the demodulating step includes the step of if the subframe is a mixed subframe, demodulating the PDSCH using a cell specific reference signal (hereinafter abbreviated CRS).

Preferably, the demodulating step includes the step of if the subframe is an LTE-A only subframe, demodulating the PDSCH using a demodulation reference signal (hereinafter abbreviated DRS).

Preferably, the method further includes the step of receiving information on a demodulation scheme of the LTE-A only subframe.

More preferably, the demodulating step includes the step of if the subframe is the LTE-A only subframe, demodulating the PDSCH according to the information on the demodulation scheme.

To further achieve these and other advantages and in accordance with the purpose of the present invention, an apparatus for receiving data, which is received by a terminal in a wireless communication system, includes a receiving module configured to receive a physical downlink control channel (hereinafter abbreviated PDCCH) and a physical downlink shared channel ((hereinafter abbreviated PDSCH) and a processor configured to demodulate the PDSCH by interpreting the PDCCH according to a type of a subframe including the PDCCH and the PDSCH.

Preferably, if the subframe is a mixed subframe, the processor demodulates the PDSCH using a cell specific reference signal (hereinafter abbreviated CRS).

Preferably, if the subframe is an LTE-A only subframe, the processor demodulates the PDSCH using a demodulation reference signal (hereinafter abbreviated DRS).

Preferably, the receiving module receives information on a demodulation scheme of the LTE-A only subframe.

More preferably, if the subframe is the LTE-A only subframe, the processor demodulates the PDSCH according to the information on the demodulation scheme.

It is to be understood that both the foregoing general description and the following detailed description are exemplary and explanatory and are intended to provide further explanation of the invention as claimed.

Advantageous Effects of Invention

According to embodiments of the present invention, a control channel is interpreted differently according to a subframe type. Therefore, the present invention reduces scheduling constraint in a system including a plurality of subframe types and is able to raise efficiency of the control channel.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 6 and FIG. 7 are diagrams of antenna ports 5, 7 and 8 (R5, R7, R8) corresponding to mobile station only reference signals;

BEST MODE FOR CARRYING OUT THE INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP2 802.16 system, they are applicable to other random mobile communication systems except unique features of the 3GPP2 802.16 system.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or stationary user stage device as a user equipment (UE), a mobile station (MS) and the like and that a base station is a common name of such a random node of a network stage communicating with a terminal as a node B, eNode B, a base station and the like.

First of all, RS of Rel-10 terminal is described with reference to FIG. 8 and FIG. 9 as follows. The Rel-10 terminal uses a demodulation reference signal (hereinafter abbreviated DRS) for demodulation and also uses a channel state information reference signal (hereinafter abbreviated CSI-RS) for channel state information feedback.

Figure 1:
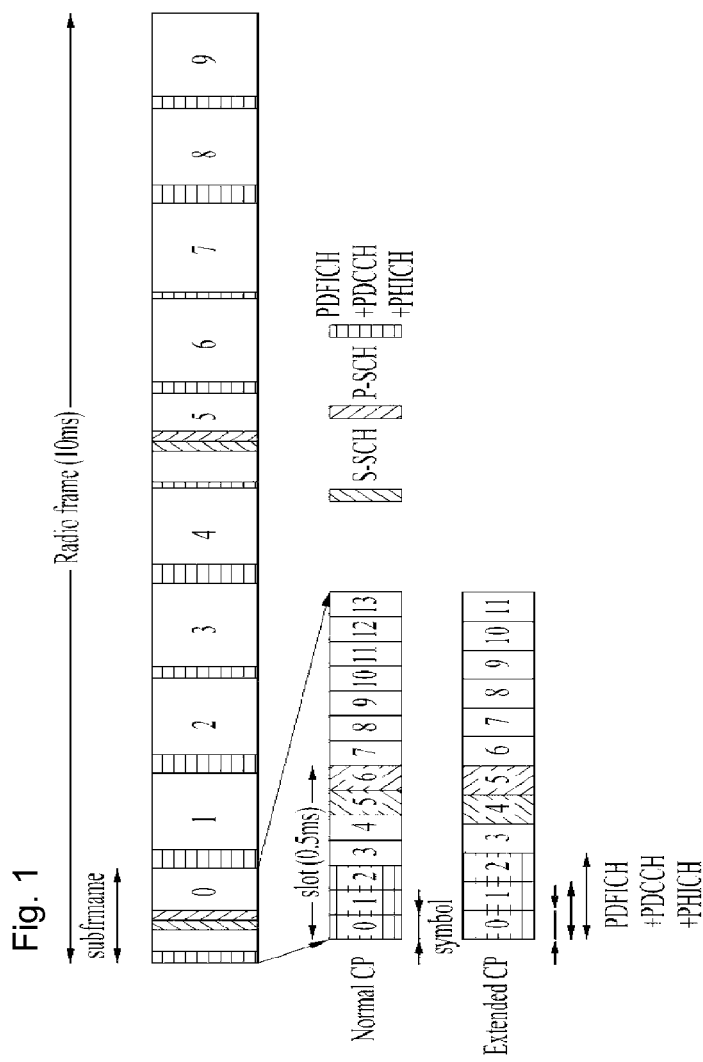
FIG. 1 is a diagram for a frame structure of LTE (long term evolution) system.
Figure 2:
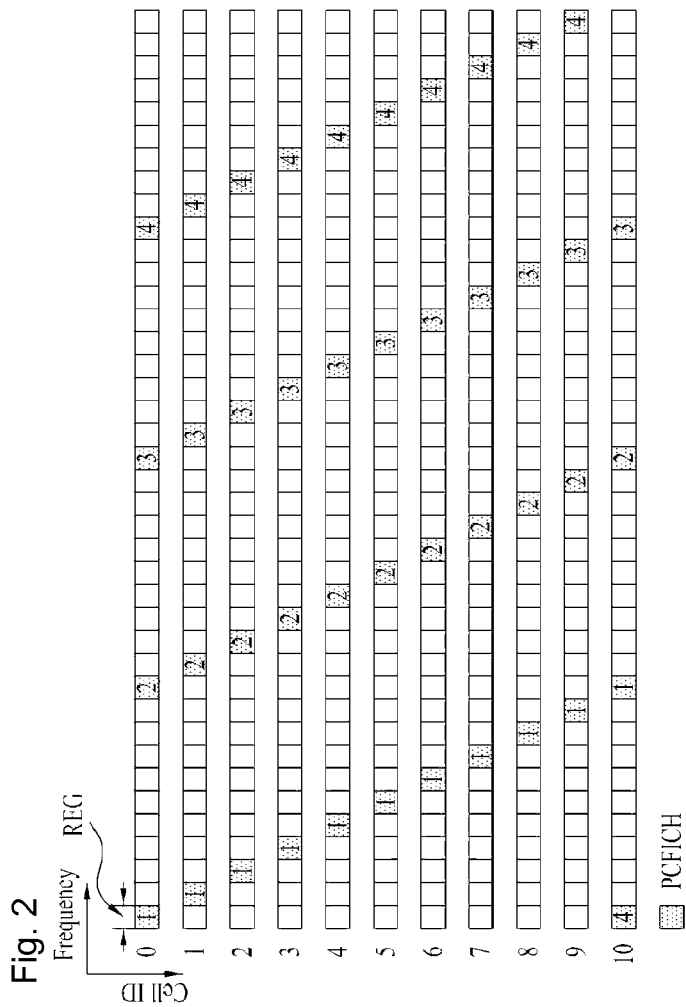
FIG. 2 is a diagram for a transmission format of PCFICH.
Figure 3:
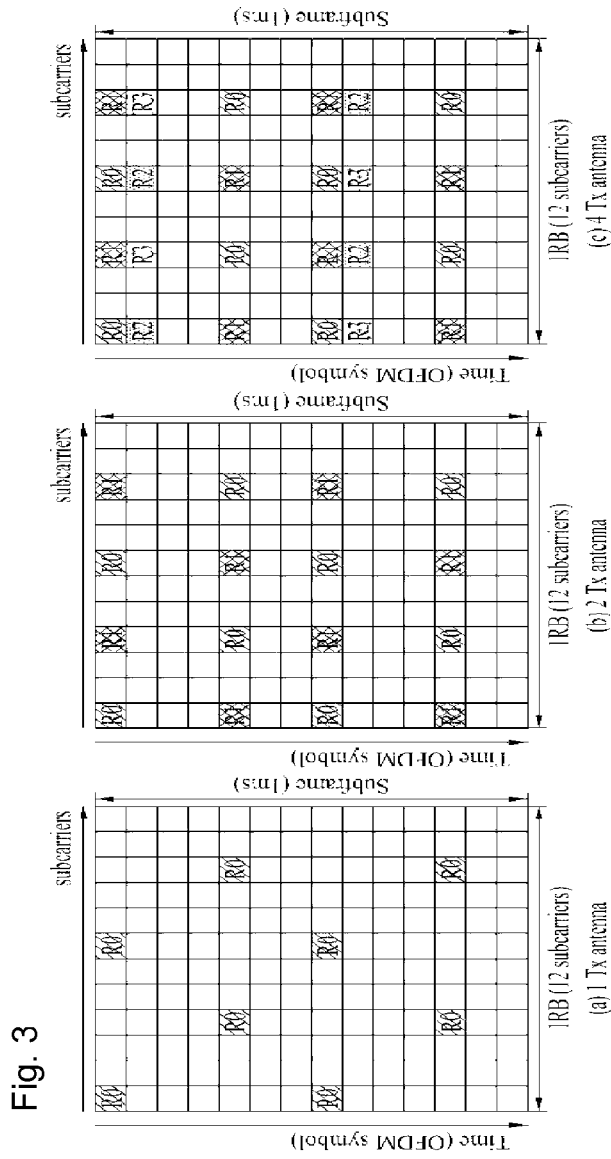
FIG. 3 is a diagram of a structure of CRS according to the number of transmitting antenna(s)
Figure 4:
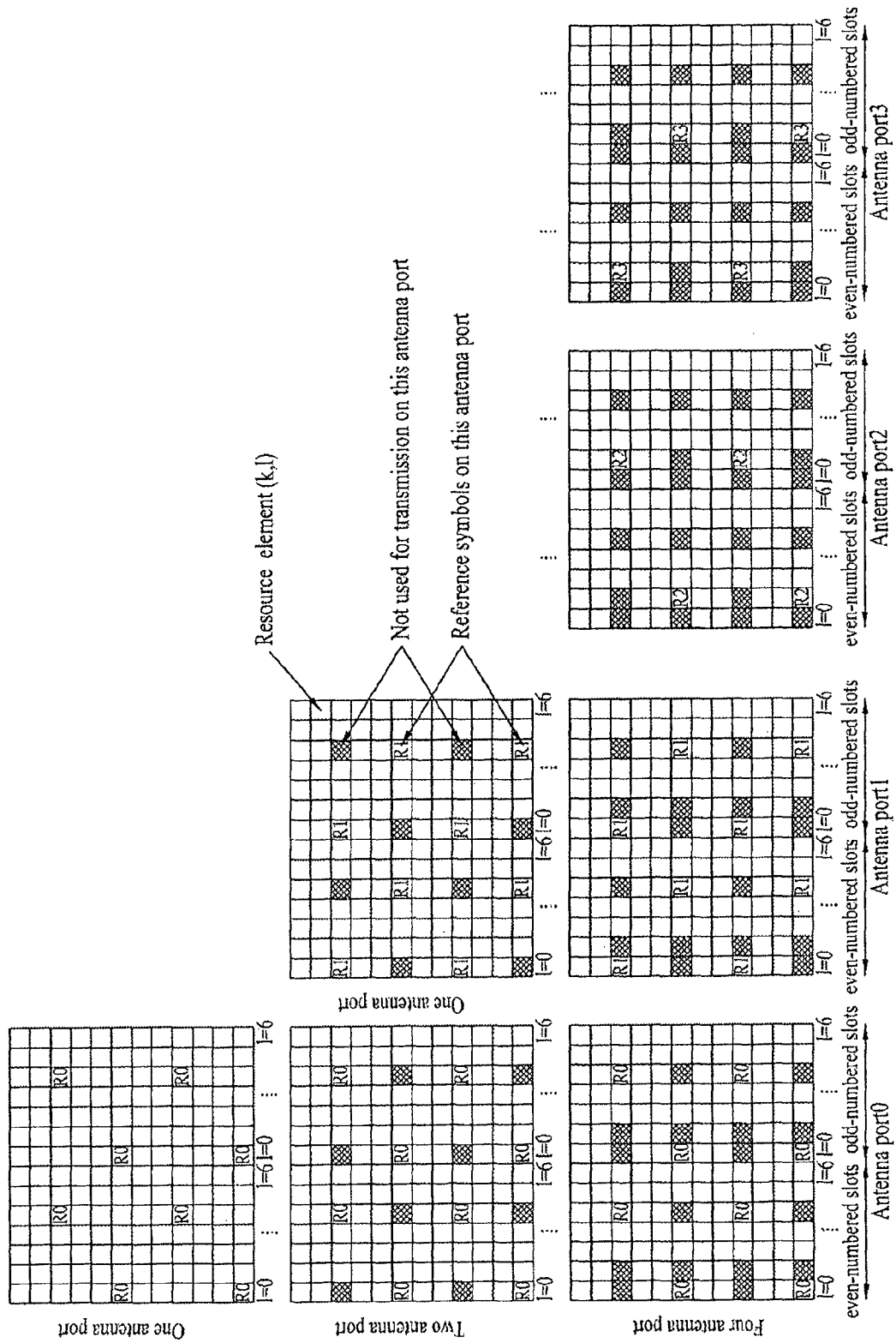
FIG. 4 is a diagram for a structure of antenna ports 0 to 3 (R0 to R3) corresponding to cell only reference signals in case of a normal CP.
Figure 5:
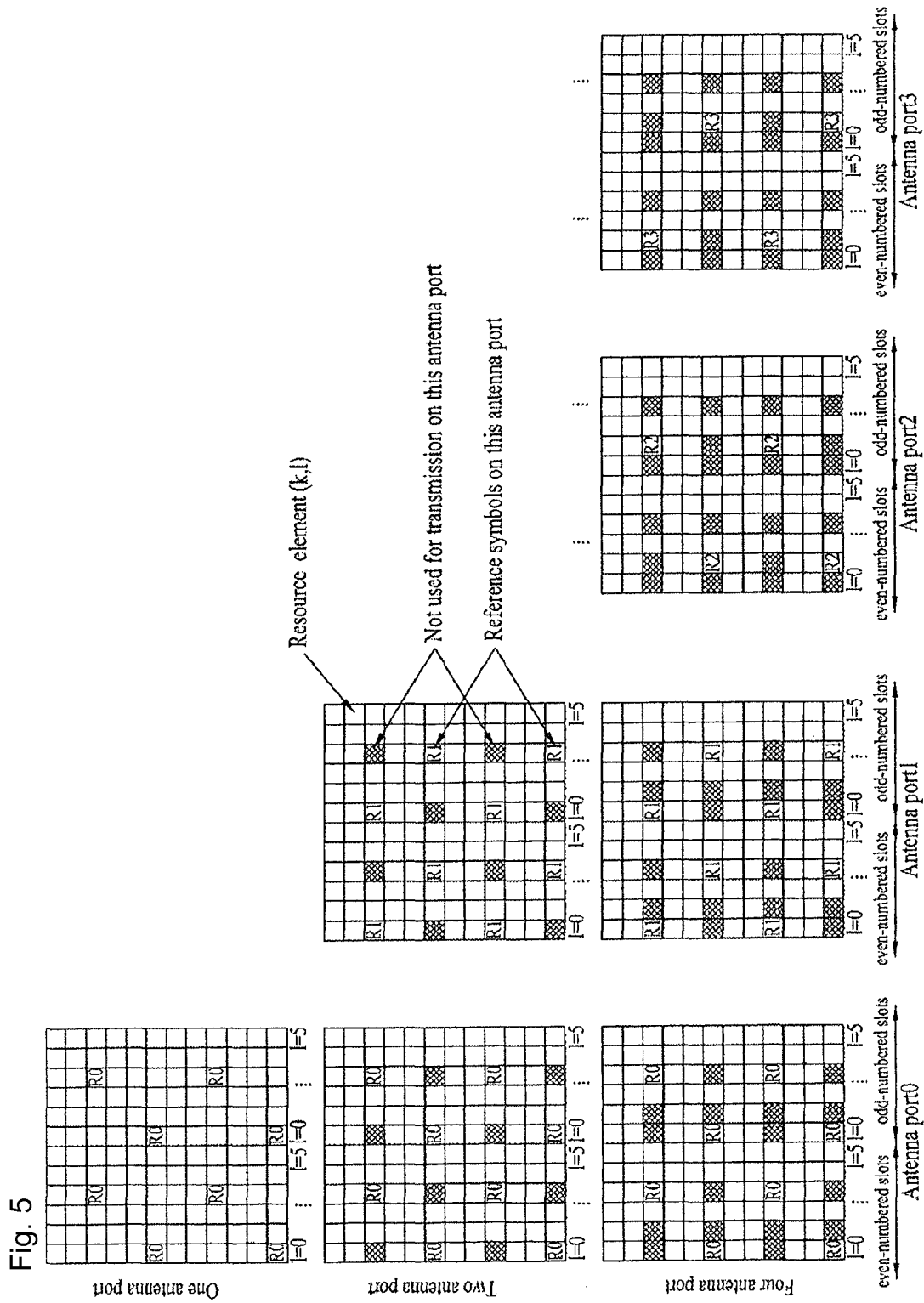
FIG. 5 is a diagram for a structure of antenna ports 0 to 3 (R0 to R3) corresponding to cell only reference signals in case of an extended normal CP.
Figure 8:
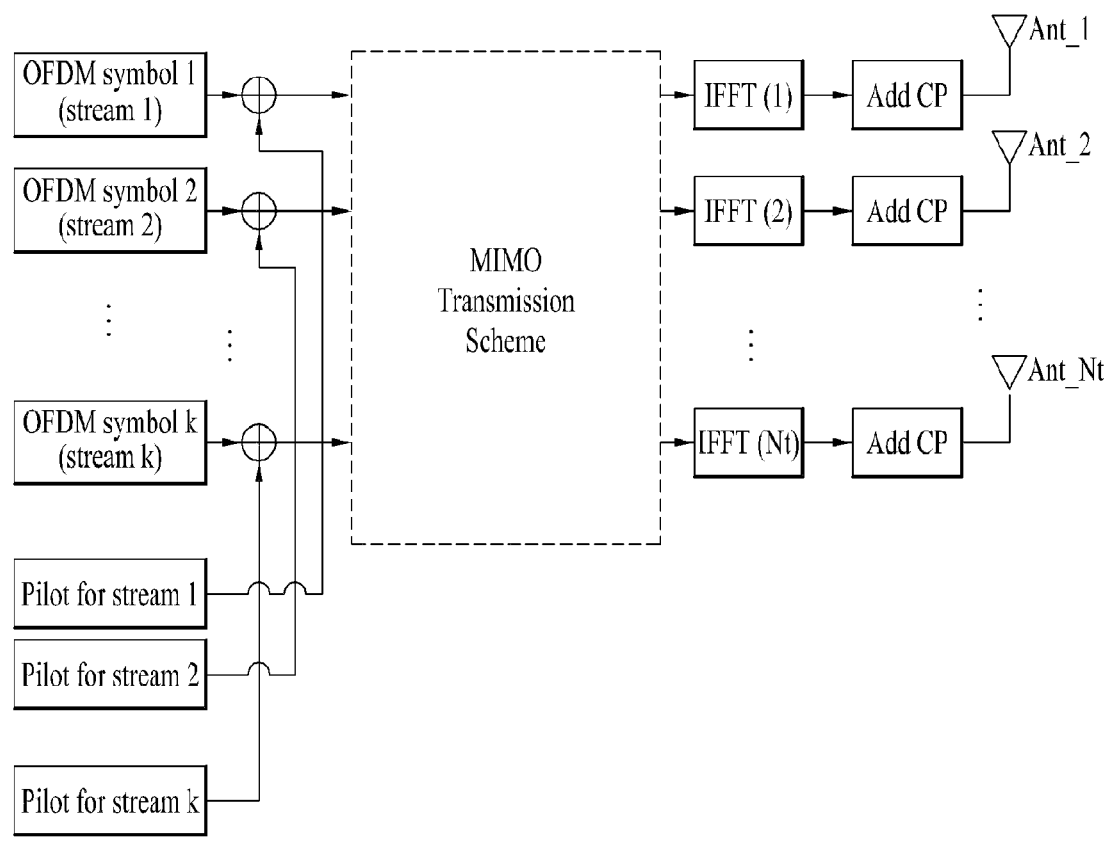
FIG. 8 is a diagram of a transmission type of DRS.

FIG. 8 is a diagram of a transmission type of DRS.

Referring to FIG. 8, since DRS is transmitted by having MIMO transmission scheme applied thereto like a data symbol, a receiver is able to use the DRS for demodulation in direct. In case that precoding is used as the MIMO transmission scheme, the DRS is precoded and then transmitted.

Figure 9:
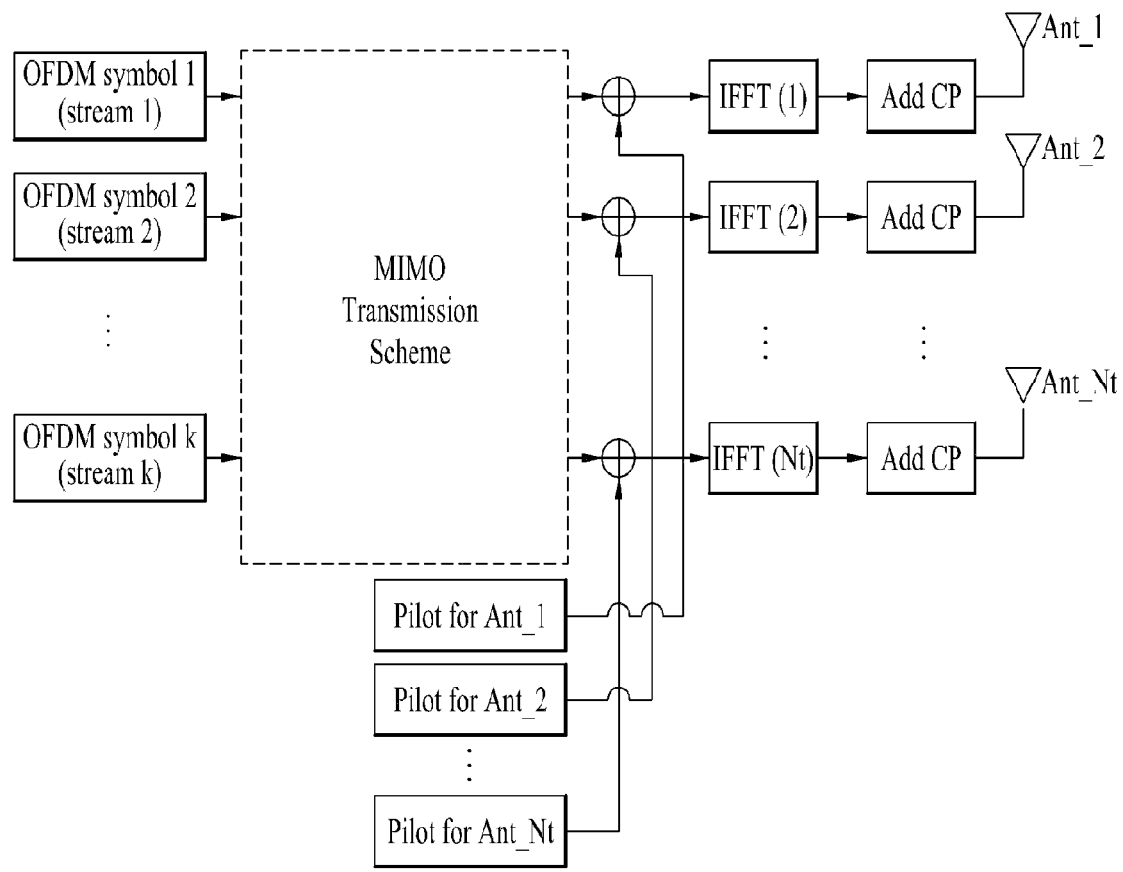
FIG. 9 is a diagram for a CSI-RS transmitting method.

FIG. 9 is a diagram for a CSI-RS transmitting method.

Referring to FIG. 9, since CSI-RS is transmitted via a corresponding physical antenna without having MIMO scheme applied thereto, a receiver is able to acquire channel information of the corresponding physical antenna using the CSI-RS. As CRS of an Rel-8 system is transmitted according to a configuration shown in FIG. 9, CRS is used for two purposes including channel state information estimation and demodulation.

In the following description, a frame structure of a wireless communication system capable of supporting Rel-8 terminal and Rel-10 terminal both is explained with reference to FIG. 10.

Figure 10:
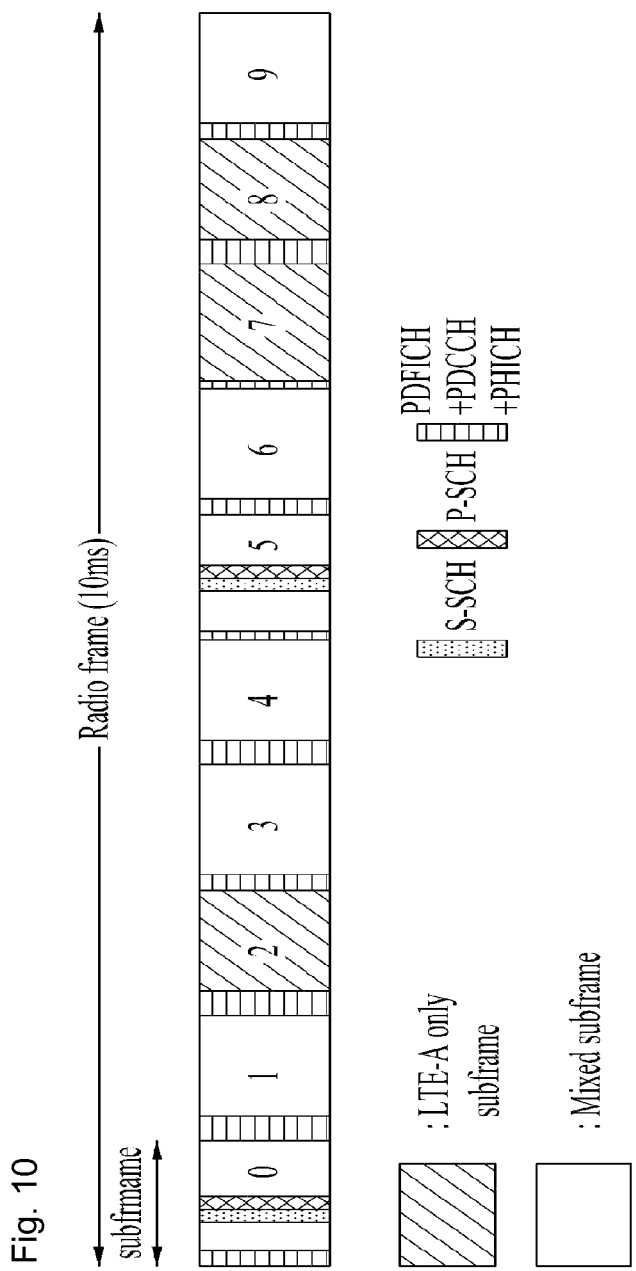
FIG. 10 is a diagram for a frame structure of a wireless communication system capable of supporting Rel-8 mobile station and Rel-10 mobile station both.

FIG. 10 is a diagram for a frame structure of a wireless communication system capable of supporting Rel-8 mobile station and Rel-10 mobile station both.

Referring to FIG. 10, in order to enhance performance of 3GPP Rel-8 system and support Rel-8 terminal and Rel-10 terminal both, a frame includes CRS, DRS and CSI-RS. Yet, since the Rel-10 terminal does not use the CRS in demodulation received data, the CRS may be recognized as unnecessary overhead. Hence, in order to minimize an overhead, MBSFN subframe does not transmit the CRS in PDSCH region but transmits the DRS and the CSI-RS only. This subframe is called an LTE-A only subframe. And, the subframe transmitting the CRS in the PDSCH region is called a mixed subframe.

Subframe types can include two kinds of types shown in FIG. 10 or a different kind of subframe type can be added thereto. The Rel-8 terminal can receive PDSCH in the mixed subframe shown in FIG. 10 only, recognizes other subframes as MBSFN subframes, and does not receive data in PDSCH region of another subframe. Yet, the Rel-10 terminal receives PDSCH in all subframes.

Figure 11:
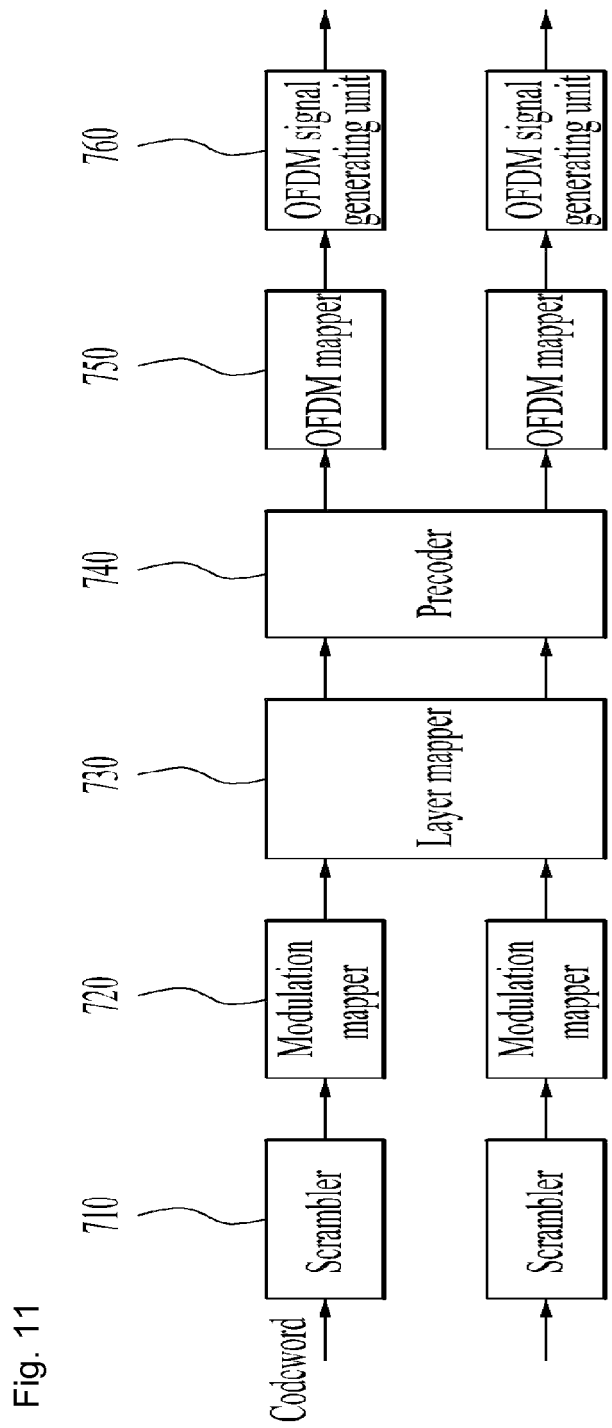
FIG. 11 is a diagram of Rel-8 transmitter.

In the following description, a configuration of Rel-8 transmitter is explained with reference to FIG. 11. FIG. 11 is a diagram of Rel-8 transmitter.

Referring to FIG. 11, an Rel-8 transmitter includes a scrambler 710, a modulation mapper 720, a layer mapper 730, a precoder 740, an OFDM mapper 750, and an OFDM signal generating unit 760.

The scrambler 710 scrambles an inputted codeword. The modulation mapper 720 modulates an inputted signal. The layer mapper 730 maps the inputted signal to a layer. The precoder 740 multiplies the inputted signal by a precoding matrix. The OFDM mapper 750 maps the inputted signal to an OFDM symbol. Finally, the PFDM signal generating unit 760 generates an OFDM signal in a manner of performing inverse fast Fourier transform on the inputted signal and then adding a cyclic prefix thereto.

Figure 12:
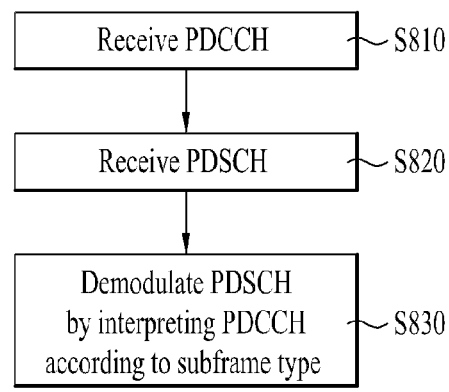
FIG. 12 is a flowchart for a data receiving method according to a first embodiment of the present invention.

In the following description, a data receiving method according to a first embodiment of the present invention is explained with reference to FIG. 12. FIG. 12 is a flowchart for a data receiving method according to a first embodiment of the present invention.

Referring to FIG. 12, a terminal receives PDCCH [S810] and then receives PDSCH [S820]. Subsequently, the terminal demodulates the PDSCH by interpreting the PDCCH according to a subframe type [S830]. In doing so, the terminal is able to demodulate the PDSCH in a manner of interpreting the same PDCCH differently according to the subframe type.

In particular, in case that a DCI format of the PDCCH is 1A, a base station transmits the PDSCH using SISO transmission or diversity scheme according to the number of transmitting antennas in a mixed subframe or transmits the PDSCH by single layer transmission in an LTE-A only subframe.

If so, the terminal demodulates the PDSCH using CRS in the mixed subframe. Since the PDSCH of the LTE-A only subframe does not include the CRS, the terminal demodulates the PDSCH in the LTE-A only subframe using the DRS.

In this case, the PDCCH is defined as a specific transmission mode and a transmission scheme for each PDCCH is determined according to the number of transmitting antennas of the corresponding system. Hence, if a terminal receives the PDCCH, the same transmission scheme is always used irrespective of the properties of the subframe. Yet, in case of Rel-10 system, there exist a mixed subframe for scheduling Rel-8 terminal and Rel-10 terminal both and an LTE-A only subframe for scheduling the Rel-10 terminal only. The Rel-10 terminal can be scheduled in the above-mentioned subframes. In this case, a specific transmission scheme may not be available for a specific subframe type. Therefore, it is preferable that a different transmission scheme is used according to a subframe type in a specific transmission mode.

For instance, a transmission mode and scheme used by 3GPP TS 36.213 V9.0.1 and the connectivity between PDCCH and transmission mode are shown in Table 4. In case of transmission mode 3, as shown in Table 4, a configuration of PDCCH (DCI format) can use DCI format 1A or CDI format 1. In this case, the DCI format 1A is configured to use a transmit diversity scheme as a fallback transmission scheme or the DCI format 1 is configured to use a large delay CDD transmission scheme or a transmit diversity scheme. Yet, it can be observed from Table 4 that each transmission mode and DCI format has a corresponding transmission scheme determined according to a DCI format irrespective of a subframe type. In Table 4, a search space indicates a region of a PDCCH for detecting the corresponding DCI format.

In case that a plurality of subframe types are available for one system, it is preferable that the same DCI format is configured to use a different transmission scheme according to a subframe type. IN particular, a terminal has to set demodulation to differ according to a subframe type while receiving the same DCI format. For instance, in a system using two kinds of subframe type, a subframe type 1 (e.g., a mixed subframe) and a subframe type 2 (e.g., an LTE-A only subframe) are configured, a specific terminal type (e.g., Rel-10 terminal) can be scheduled to all subframe types, and a specific terminal type (e.g., Rel-8 terminal) can be scheduled to a specific subframe type only.

TABLE 4

| Transmission mode | DCI format | Search Space | Transmission scheme of PDSCH corresponding to PDCCH |
|---|---|---|---|
| Mode 1 | DCI format 1A | Common andUE specific by C-RNTI | Single-antenna port, port 0 (see subclause 7.1.1) |
| | DCI format 1 | UE specific by C-RNTI | Single-antenna port, port 0 (see subclause 7.1.1) |
| Mode 2 | DCI format 1A | Common andUE specific by C-RNTI | Transmit diversity (see subclause 7.1.2) |
| | DCI format 1 | UE specific by C-RNTI | Transmit diversity (see subclause 7.1.2) |
| Mode 3 | DCI format 1A | Common andUE specific by C-RNTI | Transmit diversity (see subclause 7.1.2) |
| | DCI format 2A | UE specific by C-RNTI | Large delay CDD (see subclause 7.1.3) or Transmit diversity (see subclause 7.1.2) |
| Mode 4 | DCI format 1A | Common andUE specific by C-RNTI | Transmit diversity (see subclause 7.1.2) |
| | DCI format 2 | UE specific by C-RNTI | Closed-loop spatial multiplexing (see subclause 7.1.4)or Transmit diversity (see subclause 7.1.2) |
| Mode 5 | DCI format 1A | Common andUE specific by C-RNTI | Transmit diversity (see subclause 7.1.2) |
| | DCI format 1D | UE specific by C-RNTI | Multi-user MIMO (see subclause 7.1.5) |

TABLE 4-continued

| Transmission mode | DCI format | Search Space | Transmission scheme of PDSCH corresponding to PDCCH |
|---|---|---|---|
| Mode 6 | DCI format 1A | Common and UE specific by C-RNTI | Transmit diversity (see subclause 7.1.2) |
| | DCI format 1B | UE specific by C-RNTI | Closed-loop spatial multiplexing (see subclause 7.1.4) using a single transmission layer |
| Mode 7 | DCI format 1A | Common and UE specific by C-RNTI | If the number of PBCH antenna ports is one. Single-antenna port, port 0 is used (see subclause 7.1.1), otherwise Transmit diversity (see subclause 7.1.2) |
| | DCI format 1 | UE specific by C-RNTI | Single-antenna port; port 5 (see subclause 7.1.1) |
| Mode 8 | DCI format 1A | Common and UE specific by C-RNTI | If the number of PBCH antenna ports is one. Single-antenna port, port 0 is used (see subclause 7.1.1), otherwise Transmit diversity (see subclause 7.1.2) |
| | DCI format 2B | UE specific by C-RNTI | Dual layer transmission; port 7 and 8 (see subclause 7.1.5A) or single-antenna port; port 7 or 8 (see subclause 7.1.1) |

Referring to Table 4, in Rel-8/Rel-9 transmission mode, a new transmission mode for Rel-10 terminal can be configured in addition. For instance, if Mode 9 is added, the corresponding usage is shown in Table 5.

TABLE 5

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 (see subclause 7.1.1) |
| | DCI format 1 | UE specific by C-RNTI | Single-antenna port, port 0 (see subclause 7.1.1) |
| Mode 2 | DCI format 1A | Common and UE specific by C-RNTI | Transmit diversity (see subclause 7.1.2) |
| | DCI format 1 | UE specific by C-RNTI | Transmit diversity (see subclause 7.1.2) |
| Mode 3 | DCI format 1A | Common and UE specific by C-RNTI | Transmit diversity (see subclause 7.1.2) |
| | DCI format 2A | UE specific by C-RNTI | Large delay CDD (see subclause 7.1.3) or Transmit diversity (see subclause 7.1.2) |
| Mode 4 | DCI format 1A | Common and UE specific by C-RNTI | Transmit diversity (see subclause 7.1.2) |
| | DCI format 2 | UE specific by C-RNTI | Closed-loop spatial multiplexing (see subclause 7.1.4) or Transmit diversity (see subclause 7.1.2) |
| Mode 5 | DCI format 1A | Common and UE specific by C-RNTI | Transmit diversity (see subclause 7.1.2) |
| | DCI format 1D | UE specific by C-RNTI | Multi-user MIMO (see subclause 7.1.5) |
| Mode 6 | DCI format 1A | Common and UE specific by C-RNTI | Transmit diversity (see subclause 7.1.2) |
| | DCI format 1B | UE specific by C-RNTI | Closed-loop spatial multiplexing (see subclause 7.1.4) using a single transmission layer |
| Mode 7 | DCI format 1A | Common and UE specific by C-RNTI | If the number of PBCH antenna ports is one. Single-antenna port, port 0 is used (see subclause 7.1.1), otherwise Transmit diversity (see subclause 7.1.2) |
| | DCI format 1 | UE specific by C-RNTI | Single-antenna port; port 5 (see subclause 7.1.1) |

TABLE 5-continued

| Transmission mode | DCI format | Search Space | Transmission scheme of PDSCH corresponding to PDCCH |
|---|---|---|---|
| Mode 8 | DCI format 1A | Common and UE specific by C-RNTI | If the number of PBCH antenna ports is one. Single-antenna port, port 0 is used (see subclause 7.1.1), otherwise Transmit diversity (see subclause 7.1.2) |
| | DCI format 2B | UE specific by C-RNTI | Dual layer transmission: port 7 and 8 (see subclause 7.1.5A) or single-antenna port; port 7 or 8 (see subclause 7.1.1) |
| Mode 9 | DCI format 1A | Common and UE specific by C-RNTI | Subframe type-1: If the number of PBCH antenna ports is one. Single-antenna port, port 0 is used (see subclause 7.1.1), otherwise Transmit diversity (see subclause 7.1.2) Subframe type-2: Single-antenna port, port 7 is used |
| | DCI format 2C | UE specific by C-RNTI | Multi layer transmission: port 7 to port 14 or single-antenna port; port 7 or 8 (see subclause 7.1.1) |

Referring to Table 5, in case of Mode 9, it can be observed that DCI format 1A used as fallback uses a transmission scheme different according to a subframe type. In case of performing single antenna port transmission, it is able to separately define whether to use port 0 or port 7 according to a subframe type.

The above mentioned subframe type can be notified to a specific terminal type only. And, the corresponding information can be announced via an RRC signal, a radio frame head or the like or can be broadcasted via a broadcasting channel. At least tow subframe types can be defined and the number of species of configurable subframe types may vary according to a terminal type.

Figure 13:
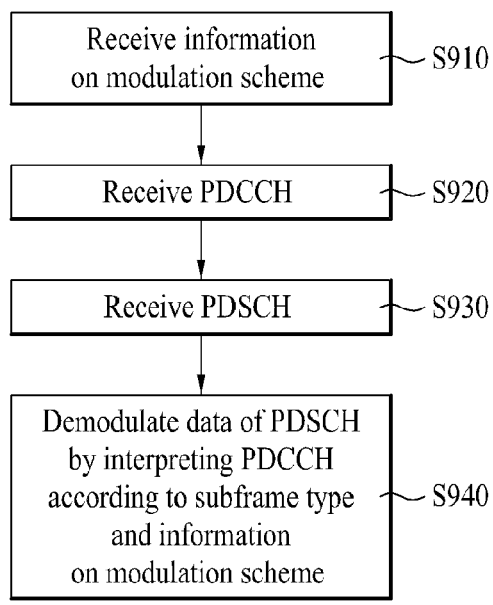
FIG. 13 is a flowchart for a data receiving method according to a second embodiment of the present invention.

In the following description, a data receiving method according to a second embodiment of the present invention is explained with reference to FIG. 13. FIG. 13 is a flowchart for a data receiving method according to a second embodiment of the present invention.

Referring to FIG. 13, a terminal receives information on a demodulation method of an LTE-A only subframe [S910]. In particular, the terminal receives information indicating whether to demodulate PDSCH of an LTE-A only subframe using CRS from a base station or PDSCH of an LTE-A only subframe using DRS. In doing so, the terminal is able to receive information on a demodulation method via PDCCH or RRC signaling.

The base station transmit PDSCH using MIMO transmission scheme irrespective of a subframe type or is able to transmit PDSCH by a different scheme according to a subframe type. In particular, the base station transmits PDSCH in a mixed subframe using an MIMO transmission scheme or transmits PDSCH in an LTE-A only subframe using a single layer transmission scheme.

In case of transmitting PDSCH using an MIMO transmission scheme irrespective of a subframe type, since a CRS does not exist in an LTE-A only subframe, channel estimation and demodulation can be performed using a CRS of a next subframe. Yet, in this case, since a CRS interval in time domain is big, performance may be considerably degraded in an environment in which a channel changes fast.

In particular, the base station transmits the PSCH of the LTE-A only subframe using the MIMO transmission scheme or the single layer transmission scheme. In case of performing the transmission using the MIMO transmission scheme, the base station instructs the terminal to demodulate the PDSCH using the CRS. In case of performing the transmission using the single layer transmission scheme, the base station instructs the terminal to demodulate the PDSCH using the DRS.

Subsequently, the terminal receives the PDSCH [S920] and then receives the PDSCH [S930].

The terminal demodulates the PDSCH by interpreting the PDCCH according to the subframe type [S940]. In doing so, the terminal is able to demodulate the PDSCH in a manner of interpreting the same PDCCH differently according to the subframe type.

In particular, in case that a DCI format of the PDCCH is 1A, the base station transmits the PDSCH using the SISO transmission or diversity scheme according to the number of transmitting antennas in the mixed frame or transmits the PDSCH in the LTE-A only subframe using the diversity scheme or the single layer transmission scheme.

If so, the terminal demodulates the PDSCH using the CRS in the mixed frame or demodulates the PDSCH in the LTE-A only subframe according to the information on the demodulation scheme received in the step S910. In particular, in case that the terminal receives the instruction to demodulate the PDSCH of the LTE-A only subframe in the step S910, the terminal demodulates the PDSCH of the LTE-A only subframe using the CRS of the next subframe. In case that the terminal receives the instruction to demodulate the PDSCH of the LTE-A only subframe using the DRS, the terminal demodulates the PDSCH of the LTE-A only subframe using the DRS.

Alternatively, the same DCI format can indicate a content different according to the subframe type. For instance, it is able to configure an MIMO transmission mode to differ according to the subframe type despite the same DCI format. In particular, the same DCI format indicates that data is transmitted in a single user MIMO mode or a multi-user MIMO mode in the mixed subframe or indicates that data is transmitted in CoMP (cooperative multi-point) in the LTE-A only subframe.

Alternatively, although the PDCCH constructed with the same bit number is used, it can be used in a manner off being interpreted differently according to the subframe type. For instance, the DCI format 1A is used in the mixed subframe and a DCI format 1E having the same information bit number is configured and used in the LTE-A only subframe. In this case, it is unable to transmit the DCI format 1E in the mixed subframe, while it is unable to transmit the DCI format 1A in the LTE-A only subframe. Namely, the LTE-A terminal is able to interpret a DCI format differently according to a subframe type despite receiving the DCI format of the same size.

Figure 14:
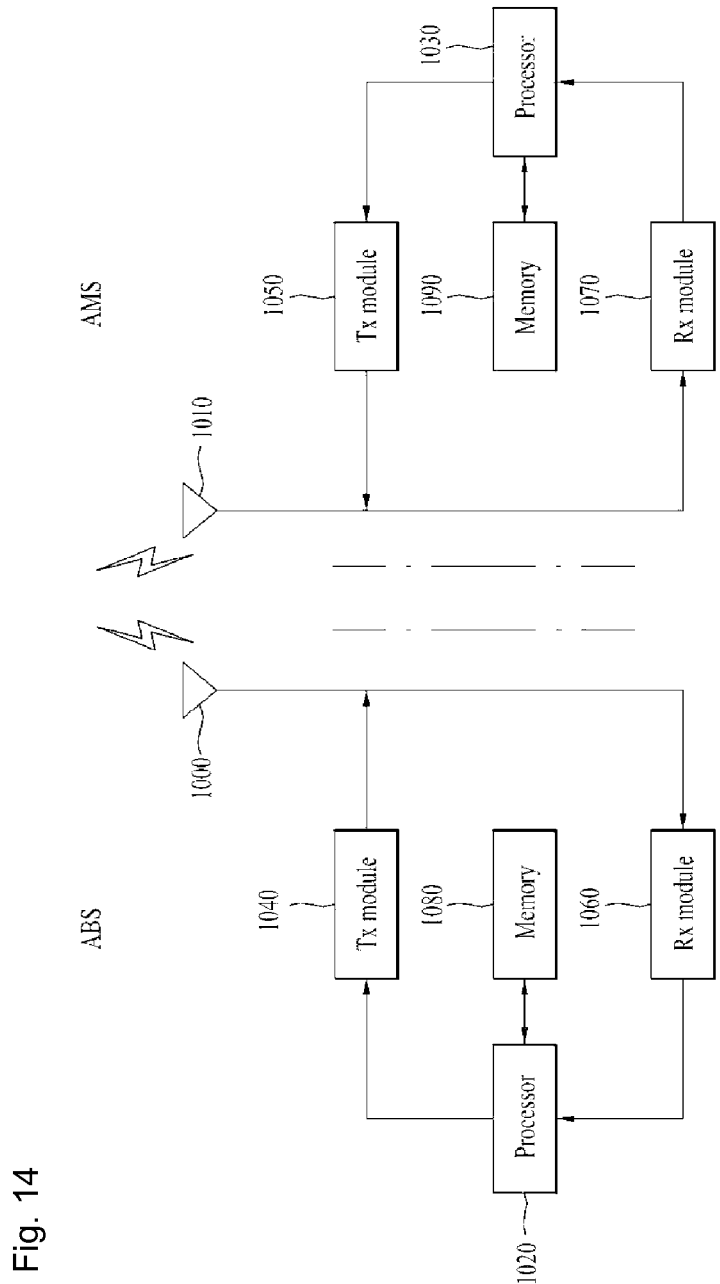
FIG. 14 is a diagram for configurations of a mobile station and a base station for implementing embodiments of the present invention according to another embodiment of the present invention.

FIG. 14 is a diagram for configurations of a mobile station and a base station for implementing embodiments of the present invention according to another embodiment of the present invention.

Referring to FIG. 14, a mobile station/base station (AMS/ABS) includes an antenna 1000/1010 configured to transmit and receive information, data, signals, messages and/or the like, a transmitting (Tx) module 1040/1050 transmitting a message by controlling the antenna, a receiving (Rx) module 1060/1070 receiving a message by controlling the antenna, a memory 1080/1090 configured to store informations related to communication with the base station, and a processor 1020/1030 configured to control the receiving module and the memory. In this case, the base station can include a femto base station or a macro base station.

The antenna 1000/1010 plays a role in transmitting a signal generated by the transmitting module 1040/1050 externally and also plays a role in receiving an external radio signal and then forwarding the received radio signal to the receiving module 1060/10100. In case that an MIMO function is supported, at least two antennas can be provided.

The processor 1020/1030 normally controls overall operations of the mobile station or the base station. In particular, the processor 1020/1030 is able to perform a control function, a MAC (medium access control) frame variable control function according to service characteristics and radio wave environment, a handover function, an authentication function, an encryption function and the like to implement the above mentioned embodiments of the present invention. The processor 1020/1030 is able to further include an encryption module configured to control encryption of various messages and a timer module configured to control transmission and reception of various messages.

The transmitting module 1040/1050 performs prescribed coding and modulation on a signal and/or data, which is scheduled by the processor and will be externally transmitted, and then delivers the coded and modulated signal and/or data to the antenna 1000/1010.

The receiving module 1060/1070 reconstructs a radio signal externally received via the antenna 1000/1010 into original data by performing decoding and demodulation on the received radio signal and is then able to deliver the reconstructed data to the processor 1020/1030.

Programs for processing and control of the processor can be stored in the memory 1080/1090. And, the memory 1080/1090 can perform a function of temporary storage of inputted/outputted data (in case of a mobile station, an uplink (UL) grant allocated by a base station, system information, a station identifier (STID), a flow identifier (FID), an action time, region allocation information, frame offset information, etc.).

Moreover, the memory 1080/1090 can include at least one of storage media including a flash memory type memory, a hard disk type memory, a multimedia card micro type memory), a card type memory (e.g., SD memory, XD memory, etc.), a Random Access Memory (RAM), an SRAM (Static Random Access Memory), a Read-Only Memory (ROM), an EEPROM (Electrically Erasable Programmable Read-Only Memory, a PROM (Programmable Read-Only Memory), a magnetic memory, a magnetic disk, an optical disk and the like.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another.

Therefore, the present invention is non-limited by the embodiments disclosed herein but intends to give a broadest scope matching the principles and new features disclosed herein.

What is claimed:

1. A method of receiving, by a user equipment, data in wireless communication system, the method comprising:
receiving, by the user equipment, a physical control format indicator channel (PCFICH) carrying a control format indicator indicating a number of orthogonal frequency division multiplexing (OFDM) symbols used for control channel transmission in a subframe;
receiving, by the user equipment, a physical downlink control channel (PDCCH) carrying downlink control information format 1A in one or more front OFDM symbols of the subframe based on the carrier format indicator; and
receiving, by the user equipment, a physical downlink shared channel (PDSCH) corresponding to the PDCCH in remaining OFDM symbols of the subframe, wherein:
the PDSCH is received using a single antenna transmission scheme or transmission diversity scheme, which is based on a cell specific reference signal (CRS), when the subframe is a non multimedia broadcast multicast service single frequency network (non-MBSFN) subframe,
the PDSCH is received using a single layer transmission scheme, which is based on a user equipment specific reference signal, when the subframe is a MBSFN subframe.

2. The method of claim 1, wherein the PDSCH is demodulated using the CRS when the subframe is a non-MBSFN subframe.

3. The method of claim 1, wherein the PDSCH is demodulated using the user equipment specific reference signal when the subframe is a MBSFN subframe.

4. The method of claim 1, wherein the transmission diversity scheme uses:

$$\frac{1}{\sqrt{2}}\begin{pmatrix} S_1 & S_2 \\ -S_2^* & S_1^* \end{pmatrix}$$

for two antenna transmission, and $$\frac{1}{\sqrt{2}}\begin{pmatrix} S_1 & S_2 & 0 & 0 \\ 0 & 0 & S_3 & S_4 \\ -S_2^* & S_1^* & 0 & 0 \\ 0 & 0 & -S_4^* & S_3^* \end{pmatrix}$$

for four antenna transmission,
where $S_1$, $S_2$, $S_3$ and $S_4$ are signals for the PDSCH, rows are corresponding to antennas, and columns are corresponding to frequency or time.

5. A user equipment for receiving data in wireless communication system, the method comprising:
a receiver, and
a processor configured to control the receiver, the processor configured to:
control the receiver to receive a physical control format indicator channel (PCFICH) carrying a control format indicator indicating a number of orthogonal frequency division multiplexing (OFDM) symbols used for control channel transmission in a subframe;
control the receiver to receive a physical downlink control channel (PDCCH) carrying downlink control information format 1A in one or more front OFDM symbols of the subframe based on the control format indicator; and
control the receiver to receive a physical downlink shared channel (PDSCH) corresponding to the PDCCH in remaining OFDM symbols of the subframe, wherein:
the PDSCH is received using a single antenna transmission scheme or transmission diversity scheme, which is based on a cell specific reference signal (CRS), when the subframe is a non multimedia broadcast multicast service single frequency network (non-MBSFN) subframe,
the PDSCH is received using a single layer transmission scheme, which is based on a user equipment specific reference signal, when the subframe is a MBSFN subframe.

6. The user equipment of claim 5, wherein the PDSCH is demodulated using the CRS when the subframe is a non-MBSFN subframe.

7. The user equipment of claim 5, wherein the PDSCH is demodulated using the user equipment specific reference signal when the subframe is a MBSFN subframe.

8. The user equipment of claim 5, wherein the transmission diversity scheme uses:

$$\frac{1}{\sqrt{2}}\begin{pmatrix} S_1 & S_2 \\ -S_2^* & S_1^* \end{pmatrix}$$

for two antenna transmission, and $$\frac{1}{\sqrt{2}}\begin{pmatrix} S_1 & S_2 & 0 & 0 \\ 0 & 0 & S_3 & S_4 \\ -S_2^* & S_1^* & 0 & 0 \\ 0 & 0 & -S_4^* & S_3^* \end{pmatrix}$$

for four antenna transmission,
where $S_1$, $S_2$, $S_3$ and $S_4$ are signals for the PDSCH, rows are corresponding to antennas, and columns are corresponding to frequency or time.

9. The method of claim 8, wherein the CRS is transmitted for demodulation of the PDSCH when the subframe is a non-MBSFN subframe.

10. The method of claim 8, wherein the user equipment specific reference signal is transmitted for demodulation of the PDSCH when the subframe is a MBSFN subframe.

11. The method of claim 8, wherein the transmission diversity scheme uses:

$$\frac{1}{\sqrt{2}}\begin{pmatrix} S_1 & S_2 \\ -S_2^* & S_1^* \end{pmatrix}$$

for two antenna transmission, and $$\frac{1}{\sqrt{2}}\begin{pmatrix} S_1 & S_2 & 0 & 0 \\ 0 & 0 & S_3 & S_4 \\ -S_2^* & S_1^* & 0 & 0 \\ 0 & 0 & -S_4^* & S_3^* \end{pmatrix}$$

for four antenna transmission,
where $S_1$, $S_2$, $S_3$ and $S_4$ are signals for the PDSCH, rows are corresponding to antennas, and columns are corresponding to frequency or time.

12. A method of transmitting, by a base station, data in wireless communication system, the method comprising:
- transmitting, by the base station, a physical control format indicator channel (PCFICH) carrying a control format indicator indicating a number of orthogonal frequency division multiplexing (OFDM) symbols used for control channel transmission in a subframe;
- transmitting, by the base station, a physical downlink control channel (PDCCH) carrying downlink control information format 1A in one or more OFDM symbols of the subframe base on the control format indicator; and
- transmitting, by the base station, a physical downlink shared channel (PDSCH) corresponding to the PDCCH in remaining OFDM symbols of the subframe, wherein:
  - the PDSCH is transmitted using a single antenna transmission scheme or transmission diversity scheme, which is based on a cell specific reference signal (CRS), when the subframe is a non multimedia broadcast multicast service single frequency network (non-MBSFN) subframe,
  - the PDSCH is transmitted using a single layer transmission scheme, which is based on a user equipment specific reference signal, when the subframe is a MBSFN subframe.

13. A base station for transmitting data in wireless communication system, the method comprising:
- a transmitter, and
- a processor configured to control the transmitter, the processor configured to:
  - control the transmitter to transmit a physical control format indicator channel (PCFICH) carrying a control format indicator indicating a number of orthogonal frequency division multiplexing (OFDM) symbols used for control channel transmission in a subframe;
  - control the transmitter to transmit a physical downlink control channel (PDCCH) carrying downlink control information format 1A in one or more OFDM symbols of the subframe based on the control format indicator; and
  - control the transmitter to transmit a physical downlink shared channel (PDSCH) corresponding to the PDCCH in remaining OFDM symbols of the subframe, wherein:
    - the PDSCH is transmitted using a single antenna transmission scheme or transmission diversity scheme, which is based on a cell specific reference signal (CRS), when the subframe is a non multimedia broadcast multicast service single frequency network (non-MBSFN) subframe,
    - the PDSCH is transmitted using a single layer transmission scheme, which is based on a user equipment specific reference signal, when the subframe is a MBSFN subframe.

14. The base station of claim 13, wherein the CRS is transmitted for demodulation of the PDSCH when the subframe is a non-MBSFN subframe.

15. The base station of claim 13, wherein the user equipment specific reference signal is transmitted for demodulation of the PDSCH when the subframe is a MBSFN subframe.

16. The base station of claim 13, wherein, for the transmission diversity scheme, the processor is configured to use:

$$\frac{1}{\sqrt{2}}\begin{pmatrix} S_1 & S_2 \\ -S_2^* & S_1^* \end{pmatrix}$$

for two antenna transmission, and $$\frac{1}{\sqrt{2}}\begin{pmatrix} S_1 & S_2 & 0 & 0 \\ 0 & 0 & S_3 & S_4 \\ -S_2^* & S_1^* & 0 & 0 \\ 0 & 0 & -S_4^* & S_3^* \end{pmatrix}$$

for four antenna transmission,
where $S_1$, $S_2$, $S_3$ and $S_4$ are signals for the PDSCH, rows are corresponding to antennas, and columns are corresponding to frequency or time.

* * * * *